(12) United States Patent
Corfield (10) Patent No.: US 10,186,257 B1
(45) Date of Patent: Jan. 22, 2019

(54) LANGUAGE MODEL FOR SPEECH RECOGNITION TO ACCOUNT FOR TYPES OF DISFLUENCY

(71) Applicant: nVoq Incorporated, Boulder, CO (US)

(72) Inventor: Charles Corfield, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 133 days.

(21) Appl. No.: 14/689,861

(22) Filed: Apr. 17, 2015

Related U.S. Application Data (60) Provisional application No. 61/983,630, filed on Apr. 24, 2014.

(51) Int. Cl.
*G10L 15/18* (2013.01)

(52) U.S. Cl.
CPC .................................. *G10L 15/18* (2013.01)

(58) Field of Classification Search
CPC ........................................................ G10L 15/18
USPC ........................................................ 704/257
See application file for complete search history.

(56) References Cited

U.S. PATENT DOCUMENTS

| | | | | |
|---|---|---|---|---|
| 7,860,719 B2* | 12/2010 | Maskey | ............. | G06F 17/2775 704/257 |
| 8,321,220 B1* | 11/2012 | Chotimongkol | ....... | G09B 19/04 704/10 |
| 2002/0156627 A1* | 10/2002 | Itoh | ....................... | G10L 15/187 704/254 |
| 2008/0046229 A1* | 2/2008 | Maskey | ............. | G06F 17/2775 704/2 |
| 2010/0027835 A1* | 2/2010 | Zhang | ............... | G06K 9/00362 382/100 |
| 2010/0104087 A1* | 4/2010 | Byrd | ................ | H04M 3/42221 379/265.09 |
| 2011/0040554 A1* | 2/2011 | Audhkhasi | ............. | G09B 19/04 704/9 |
| 2011/0213610 A1* | 9/2011 | Chen | ................... | G06F 17/2715 704/9 |
| 2013/0268271 A1* | 10/2013 | Osada | ..................... | G10L 15/08 704/240 |

OTHER PUBLICATIONS

Siu, Manhung, and Mari Ostendorf. "Variable n-grams and extensions for conversational speech language modeling." IEEE Transactions on Speech and Audio Processing 8.1 (2000): 63-75.*

* cited by examiner

*Primary Examiner* — Edwin S Leland, III
(74) *Attorney, Agent, or Firm* — Perkins Coie LLP (57) ABSTRACT

The technology of the present application provides a modified language model to allow for the recognition of speech containing types of disfluency. The modified language model includes a plurality of n-grams where an n-gram comprises a sequent of words. The language model also has at least one synthetic n-gram where the synthetic is a naturally occurring n-gram combined with a disfluency token. The disfluency token is representative of multiple types of disfluency and multiple pronunciations thereof.

17 Claims, 4 Drawing Sheets

LANGUAGE MODEL FOR SPEECH RECOGNITION TO ACCOUNT FOR TYPES OF DISFLUENCY

CLAIM OF PRIORITY UNDER 35 U.S.C. §§ 119 AND 120

The present patent application claims priority to U.S. Provisional Patent Application Ser. No. 61/983,630, filed Apr. 24, 2014, the disclosure of which is incorporated herein by reference as if set out in full.

REFERENCE TO CO-PENDING APPLICATIONS FOR PATENT

None.

BACKGROUND

Field

The technology of the present application relates generally to speech recognition systems, and more particular, to apparatuses and methods to allow for disfluency in a language model.

Background

Early speech to text engines operated on a theory of pattern matching. Generally, these machines would record utterances spoken by a person, convert the audio into a sequence of possible phonemes, and then find a sequence of phonemes for words that is allowed by the pattern and which is the closest, or most likely, match to the sequence of possible phonemes. For example, a person's utterance of "cat" provides a sequence of phonemes. These phonemes can be matched to reference phonetic pronunciation of the word "cat". If the match is exact or close (according to some algorithm), the utterance is deemed to match "cat"; otherwise, it is a so-called "no-match". Thus, the pattern matching speech recognition machine converts the audio file to a machine readable version "cat." Similarly, a text to speech engine would read the data "cat", convert "cat" into its phonetic pronunciation and then generate the appropriate audio for each phoneme and make appropriate adjustments to the "tone of voice" of the rendered speech.

Pattern matching machines, however, have limitations. Generally, pattern matching machines are used in a speaker independent manner, which means they must accommodate a wide range of voices and which limits the richness of patterns that will provide good matches across a large and diverse population of users.

Pattern matching speech recognition engines are of value because they are deployable and usable relatively rapidly compared to natural language or free form, continuous speech recognition engines. They can recognize simple formulaic responses with good accuracy. However, as they are not overly robust, pattern matching speech recognition is currently of limited value because it cannot handle free form speech, which is akin to pattern matching with an extremely large and complex pattern that generally includes a language model to predict and score possible word sequences.

In view of these limitations, speech recognition engines have moved to a free form, continuous or natural language speech recognition system. The focus of natural language systems is to match the utterance to a likely vocabulary and phraseology, and determine how likely the sequence of language symbols would appear in speech (sometimes referred to as a sequence of possible words in the language model). Continuous speech recognition engines return sequences of words which are the best fit for the audio. For a given sequence of words the fit is a combination of two scores (or probabilities): one score indicates how well the phonemes for the words match the supplied audio; and the other is the likelihood of that sequence (of words) given the supplied language model. Similar sounding sequences of words will have similar phonemic scores (how well their phonemes match the audio). However, the same similar sounding sequences may have quite different likelihoods when scored by the language model. Determining the likelihood of a particular sequence of language symbols is generally called a language model. The language model provides a powerful statistical model to direct a word search based on predecessor words for a span of n words. In other words, a natural language or free form speech recognition engine uses an acoustic model to match phonemes and a language model to determine whether a particular word or set of words is more likely than another word or set of words.

The language model uses probability to select the more likely words for similar sounding utterances. For example, the words "see" and "sea" are pronounced substantially the same in the United States of America. Using a language model, the speech recognition engine would populate the phrase: "Ships sail on the sea" correctly because the probability indicates the word "sea" is more likely to follow the earlier words in the sentence. The mathematical model which determines what phoneme sequence(s) are the best match to the supplied audio is called the Hidden Markov Model. The details of the hidden Markov model are well known in the industry of speech recognition and will not be further described herein.

Developing a language model, as mentioned above, is reasonably well known in the industry; the details of the development will, therefore, not be discussed herein in detail. However, by way of background, a general overview of the operation of a language model will be explained. The language model is a statistical model of word sequences. The language model is generally obtained by inputting a volume, or corpus, of words into the language model. The corpus, generally, is obtained from written text samples with the assumption that the written text is a good approximation of the spoken word. The corpus may include, among other things, text books, emails, transcriptions, notes, papers, presentations, or the like. Using the corpus, the language model provides summary statistics on the occurrence of unigrams, bigrams, and trigrams (i.e., n-grams up to some cutoff value, which is usually three or four). For example, how often a single word appears in the language (a "unigram"), such as, for example, the word "sea" as identified above, how often a combination of two words in a particular order appear in the language (a "bi-gram"), such as, for example, "the sea", how often a combination of three words appear in a particular order (a "tri-gram"), such as, for example, "on the sea", how often a combination of four words in a particular order appear in the language (a "quadra-gram"), such as, for example, "sail on the sea", and so on. While the language model can extend to penta-grams, hexa-grams and so on, there is currently a practical limit on the processing power and memory requirements for the speech recognition engine. Also, for simplicity, the technology of the present application will generally be explained with respect to tri-gram engines; although, the technology explained herein is applicable to a language model using any number of word sequences. Moreover, for clarity, n-grams developed from the corpus of material will be referred to as a clean language model or clean n-grams.

Today's language models also recognize that the corpus may not include all sequences of spoken words. For example, with a tri-gram speech recognition system, the corpus may have the individual words A, B, and C (in other words uni-grams where A, B, and C generically represent words). The corpus also may have the bi-gram AB and the bi-gram BC, but does not contain the tri-gram ABC. The speech recognition system provides for the possibility of the tri-gram sequence ABC even though the corpus does not have the tri-gram ABC. The probability of occurrence of the sequence of words ABC is estimated by the conditional probability of C following AB. If the trigram ABC occurs in the corpus, there is a value for this probability in the language model. However, if ABC does not occur naturally, we estimate using other entries in the language model, such as the probability of BC (probability that C follows B) multiplied by a back off weight. Determining back-off weights, is generally well known in the industry. For clarity, back off weights determined from the n-grams in the corpus may be referred to as clean occurring back off weights.

As can be appreciated, the corpus as written text may not include the typical foibles of speech. Even the most polished speakers frequently have what are called disfluency in their speech pattern. There are several types of disfluency in speech. The most common type of disfluency is the "filled pause," where the speaker pauses momentarily and says phrases such as "er", "ah", "um", or the like, which actual utterances vary between cultures and dialectics. Other common types of disfluency include repetitions and repairs. Repetitions where a speaker begins a sentence with a word, such as "I" or "We" and then repeats it before carrying on. Repairs occur when a speaker realizes he misspoke; he stops, and then starts over and says what he meant to say.

While in everyday speech a disfluency is no more than a bother, a disfluency is particularly problematic for a free form, continuous or natural language speech recognition system. As one can appreciate, the language model attempts to match word sequences, such as a tri-gram (or 3 words in our exemplary system). If the three word sequence does not have a match, the language model backs off and attempts to match word sequences as a bi-gram or a uni-gram using the above noted back-off weights and conditional probabilities. A disfluency in the audio is unmatchable in the natural language model, which means that the best fitting word sequence will likely contain errors, because the engine has too accommodate the presence of the disfluency.

Thus, against this background, it is desirable to provide an improved language model to account for the disfluency in speech.

SUMMARY

To attain the advantages and in accordance with the purpose of the technology of the present application, methods and apparatuses to improve free form speech recognition provide a modified language model that more readily accounts for disfluency.

In certain aspects, the technology of the present application provides a modified language model. The modified language model comprises a clean language model, which comprises a plurality of first n-grams generated from a corpus of material, written or otherwise, and at least one synthetic n-gram. The synthetic n-gram comprises at least one word from the plurality of first n-grams and at least a first disfluency token. The disfluency token represents at least one type of disfluency.

In other aspects, the technology of the present application provides the modified language model as part of a speech recognition engine where the speech recognition engine uses an acoustic engine to develop at least one phoneme for each word uttered. The at least one phoneme for the uttered word is used by the language engine and the modified language model stored in the language model memory to determine the statistically likely word that matches the at least one phoneme given the previously identified words. The modified language model contained in the language model memory includes at least one synthetic n-gram where the synthetic n-gram includes a word sequence that includes at least one word and at least one disfluency token.

The modified language model may be pruned in at least one embodiment of the technology of the present application. The pruning of the modified language model may be due to size or speech requirements. The pruning of the modified language model removes at least one naturally occurring n-gram or at least one synthetic n-gram.

The technology of the present application also provides apparatus capable of recognizing speech using a modified language model.

The foregoing and other features, utilities and advantages of the invention, will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

DETAILED DESCRIPTION

The technology of the present application will now be explained with reference to the figures. While the technology of the present application is described with relation to a speech recognition system using a tri-gram language model, one of ordinary skill in the art will recognize on reading the disclosure that the technology of the present application is usable with a bi-gram language model or more than a tri-gram language model. Also, while the technology of the present application is described with specific examples relating to filled pauses, the most common type of disfluency, one of ordinary skill in the art will now recognize that the technology of the present application is usable to address other types of disfluency.

The technology of the present application will be described with reference to particular discrete processors, modules, or parts, but one of ordinary skill in the art will recognize on reading the disclosure that processors may be integrated into a single processor or server, or separated into multiple processors or servers. Moreover, the technology of the present application will be described generically and portions of the present application may be loaded onto a particular user's client device (fat or thick client) or hosted by a server that is accessed by the client device (thin client). The technology described herein is a non-transient medium. Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Figure 1:
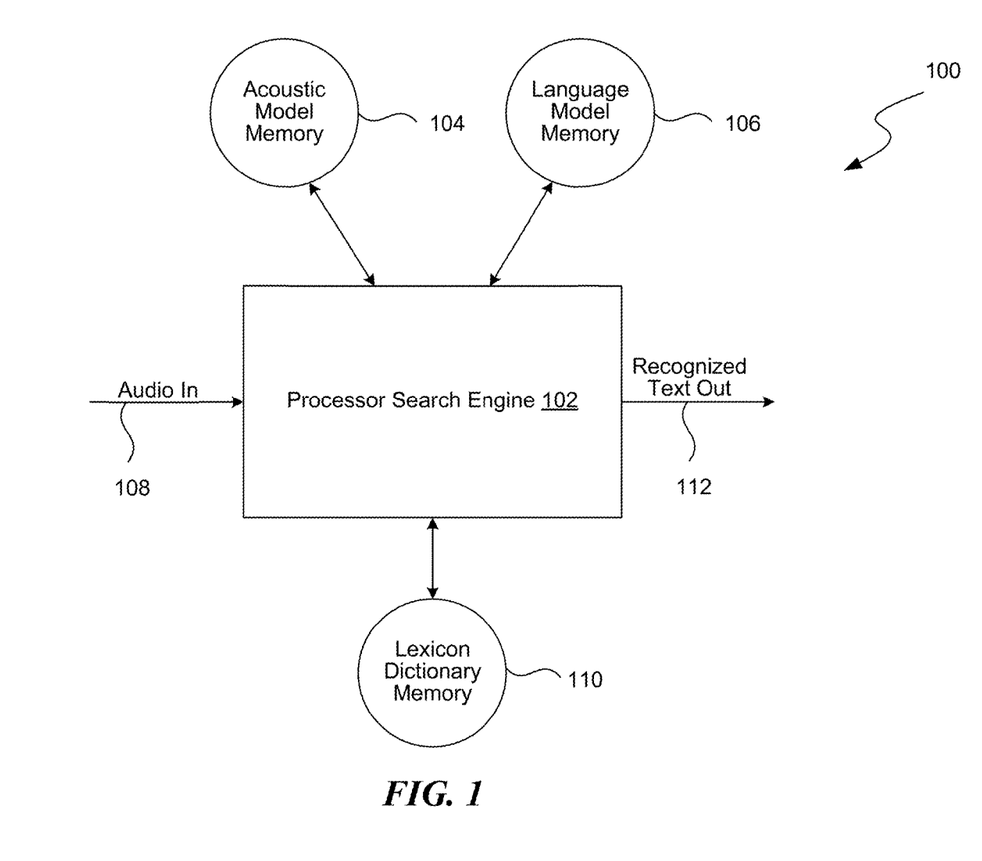
FIG. 1 is a functional block diagram of a speech recognition system consistent with the technology of the present application.

Referring now to FIG. 1, part of a free form, continuous speech recognition system 100 is provided for reference. The speech recognition system 100 includes a processor 102 that is configured to run a search algorithm by executing code contained in one or more operatively linked memories as outlined below. The processor 102 may be a single processor as shown or several processors operatively coupled together. The processor 102 is coupled to an acoustic model memory 104 and a language model memory 106. The acoustic model memory 104 and the language model memory 106 may be separate as shown or combined into a common memory. The code may be contained in a non-transient medium.

An audio data stream 108 is received by the processor 102. The audio data stream 108 may be digitized. Alternatively, the processor 102 may include a digitizer or an analog-to-digital converter not specifically shown. The processor 102 takes the audio data stream 108 and using the search algorithms determines in conjunction with the acoustic model memory 104 at least one phoneme sequence that matches the supplied audio. The at least one phoneme sequence is generally scored or has a probability that the audio matches the at least one phoneme sequence. The processor 102 also uses the search algorithms in conjunction with the language model stored in the language model memory 106 to determine the likelihood or probability that the audio is at least one sequence of words, and generally predicts one or more likely next words not yet supplied to the processor 102 for recognition. The processor 102 uses a lexicon dictionary memory 110 to score the at least one word sequence against the audio data stream 108, which may include matching the phonemes of the at least one word sequence with the phonemes of the audio. The processor 102 combines the scores using one of several known recognition algorithms to output the recognized text 112. The description of the speech recognition engine 100 is by way of background for context of the technology of the present application as speech recognition is known in the art. Moreover, the technology of the present application is usable with any known speech recognition engine that uses a language model.

As mentioned above, the language model memory 106 is developed using a corpus of material, which may include a number of written materials such as books, transcripts of audio, emails, or the like. The written materials, including the transcripts of audio, are typically final versions of the actual audio provided. In other words, the transcripts do not include stutters, filled pauses, and the like as described above. The clean (or sometime referred to as original) language model comprises a number of n-grams extracted from the corpus, which n-grams may be referred to as the naturally or clean occurring n-grams. As everyone who has attended a public event knows, even the most fluent speakers may have a pause in a speech or conversation where they use terms such as "er", "ah", "um", and the like (depending on cultures and dialects). Thus, the final recognized words may comprise the three words "on the sea," in this exemplary embodiment, but the actual audio data stream 108 input to the processor 102 may comprise "on um the er sea." With reference to the above sequence of events, the word for "on" is identified by the processor 102 as part of the language model. The processor 102 would next attempt to identify bi-gram that now includes the disfluency "um", which is the next word in the above audio data stream 108 "on um". In other words, the processor 102 would attempt to match the bi-gram "on um" using the language model memory 106 and the search algorithms, which bi-gram combination is non-existent in the corpus used to create the language model 106. The processor 102, correspondingly, would back off and recognize the word "um" as the next word. Subsequently, the next word in the audio data stream 108 is "the", and the processor 102 would attempt to locate the bi-gram "um the" or the tri-gram "on um the", neither of which exists in the corpus as the corpus was cleaned up to avoid such constructions. Thus, the word "the" would be recognized by the processor 102 using the back off as are conventionally known. While the technology is sufficient for an adequate recognition in most cases, the recognition in this method is inefficient and does not use the powerful statistical models associated with matching a sequence of words. For reference, flipping a coin shows how knowing predicate states increases the odds of success. Prior to flipping coins, the probability of flipping any sequence of results, such as three heads in a row, is 1 in 8 tries. Whereas, if you already know that two heads have been flipped, the probability that the next flip will be heads and result in the three heads in a row is 1 in 2. Similarly, if the system recognizes predecessor words in n-grams, the probability of the subsequent words being correct is increased.

As mentioned above, conventional language engines and language model memories have a difficult time addressing audio with any disfluency, and the more disfluencies in a speaker's audio, the more inefficient the speech recognition engine 100 becomes. Thus, the conventional language model should be adapted to account for the types of disfluency to be corrected. For ease of reference, the technology of the present application outlines the corrections with reference to the filled pause disfluency, as mentioned above; although, one of ordinary skill in the art would now recognize that the technology described in the present application could be used to correct for other types of disfluency. To distinguish the original, natural, or clean language model, which does not have disfluency in the corpus (e.g. the clean language model only has naturally occurring n-grams), and the updated language model, which has disfluency inserted into the corpus, the technology of the present application refers to a "clean language model" and a "modified language model." As will be explained below, n-grams with a disfluency token will be identified as synthetic n-grams.

Figure 2:
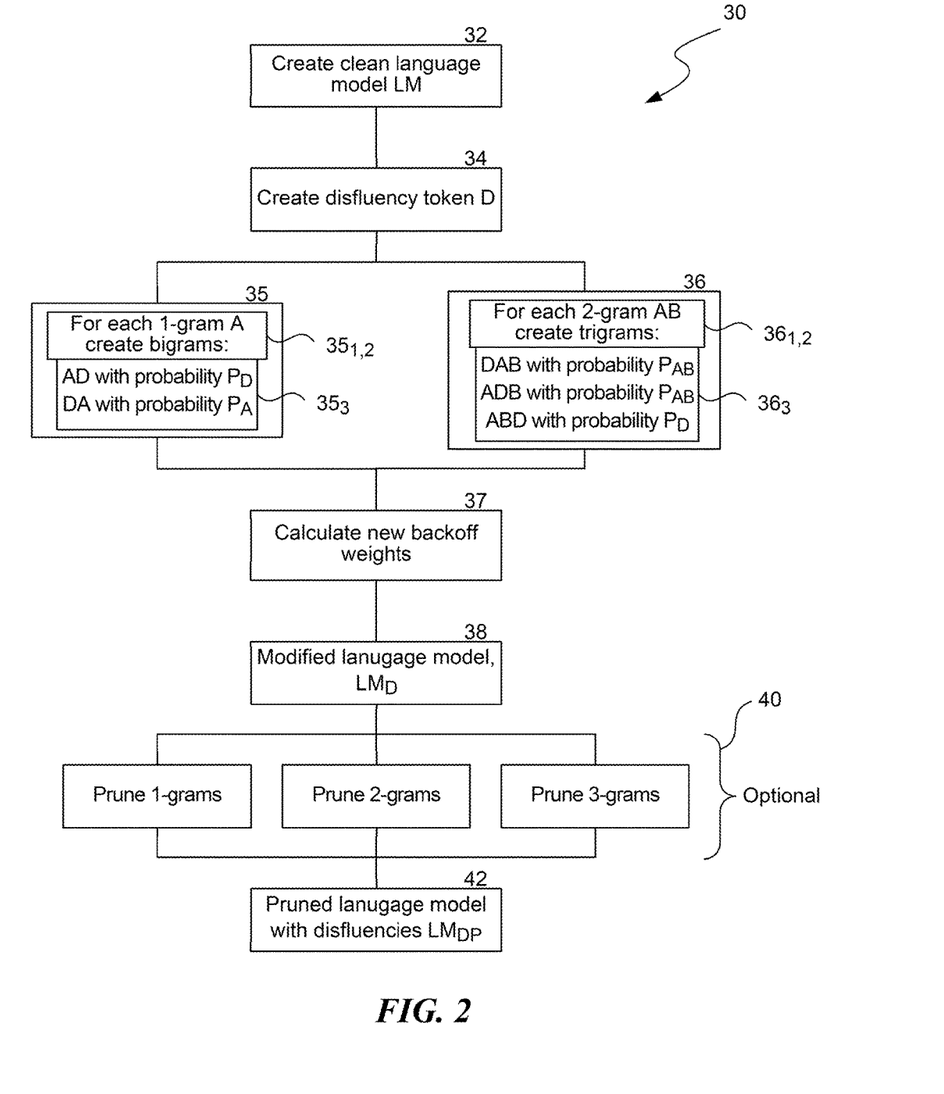
FIG. 2 is a flowchart illustrative of a methodology of a developing model consistent with the technology of the present application.

With reference to FIG. 2, a flowchart 30 is provided showing one exemplary methodology of creating a modified language model from a clean language model. While flowchart 30 is provided with a number of discrete steps for convenience, one of ordinary skill in the art will now recognize that many of the steps may be divided into multiple steps and many of the steps may be combined into a single step. Moreover, while shown in a particular order or arrangement, the steps as outlined herein may be performed in a number of orders without departing from the spirit and scope of the present application.

The process 30 begins by creating or obtaining a clean language model, step 32. The clean language model may be obtained from the corpus of material, as identified above, as is generally known in the art. Alternatively, the language model may be available from any of a number of sources conventionally available. Next, a token D is generated to be representative of a disfluency that is to be addressed by the modified language model, step 34. In this exemplary embodiment, the disfluency token described relates to the filled pause, but could relate to other types of disfluencies. The disfluency token D is assigned a number of different pronunciations, step $34_1$. In other words, the disfluency token D is the same regardless of whether the disfluency is "um", "ah", "er", or the like as identified above for American English. Another way of considering the above is that the different phonemes for "ah", "um", and "er" all map to the same disfluency token D. Also, the probability of a disfluency occurring is assigned a predetermined probability P(D), step $34_2$. The probability of a disfluency occurring is different for any given speaker. However, it has been found that language models are relatively flexible (or insensitive) to the occurrence of a disfluency. The probability that the speaker will utter a disfluency at any given point in an audio stream will be set to 1 in this particular exemplary embodiment. However, the probability may be set over a relatively large range including such as, for example, from about 0.01% to 10%. In some embodiments, the probability may be no more than about 10% and in some embodiments, the probability may be no less than about 0.01%.

Once the disfluency token is generated and the probability is assigned, the clean language model is updated to account for the disfluency. In other words, the clean language model is used to generate the modified language model. The clean language model has a number of uni-grams $A_{1-n}$, a number of bi-grams $A_{1-n}B_{1-m}$, and a number of tri-grams $A_{1-n}B_{1-m}C_{1-l}$.

The uni-grams $A_{1-n}$ all are associated with a particular probability of being spoken in the corpus. Each uni-gram $A_{1-n}$, in other words, has a probability of being spoken, which probability can be represented as $P(A_{1-n})$. Each uni-gram $A_{1-n}$ is used to generate a pair of new bi-grams using the disfluency token, step 35. Thus, for example, uni-gram A is used to generate a pair of new bi-grams DA and AD, step $35_1$, which are the possible bi-grams comprising the disfluency token D and the uni-gram A. After the generation of each new (or synthetic) bi-grams, it is determined if a next uni-gram exists, step $35_2$. If a next uni-gram exists, step $35_1$ is repeated. If a next uni-gram does not exist, the process moves to the creation of new tri-grams (as will be explained below). The new bi-gram is called a synthetic bi-gram, in some instances, as the bi-gram is not contained in the corpus of material.

Thus, for the example of uni-grams $A_{1-n}$, the process first takes uni-gram $A_1$ and creates a pair of new bi-grams $DA_1$ and $A_1D$. Next, the process takes the next uni-gram $A_2$ and creates a pair of new bi-grams $DA_2$ and $A_2D$. The process continues until the uni-gram $A_n$ is used to create the synthetic bi-grams $DA_n$ and $A_nD$. The new bi-grams are assigned a probability of occurrence, step $35_3$. Assuming the disfluency is random, and equally possible anywhere in speech, the probability of $P(DA_{1-n})$ equals the probability of $P(A_{1-n})$, which essentially trains the language model to ignore the leading disfluency. For reference, P stands for probability and the $(DA_{1-n})$ stands for the disfluency followed by the uni-gram $A_{1-n}$. Thus, $P(DA_{1-n})$ stands for the probability of a disfluency being followed by a uni-gram. In other words, the spoken "er on" would have the same probability of occurring as the uni-gram "on", which is appropriate as the speech recognition engine 100 recognizes the audio "er on" and "on" identically by outputting "on" as output 116. Again, assuming the disfluency is random, the probability of a trailing disfluency is the probability of the disfluency as set previously at step $34_2$. A trailing disfluency would be the audio of "on er" using the above example. Thus, the probability of $A_{1-n}D$ is the same as the probability of D. Thus, $P(A_{1-n}D)$ equals P(D), which is 1% in this particular exemplary embodiment.

Subsequently or substantially at the same time, the process generates new or synthetic tri-grams for each previously existing bi-gram in the clean language model. A bi-gram may be represented by $A_{1-n}B_{1-m}$. For example, a bi-gram in the language model may be the aforementioned "on the" or "the sea". Each bi-gram $A_{1-n}B_{1-m}$ is used to create three new tri-grams consisting of a leading, intermediate, and trailing disfluency (similar to using the uni-grams to create bi-grams), step 36. The new tri-grams may be represented by $DA_{1-n}B_{1-m}$, $A_{1-n}DB_{1-m}$, and $A_{1-n}B_{1-m}D$. Thus, for example, bi-gram AB is used to generate three new tri-grams DAB, ADB, and ABD, step $36_1$. After the generation of each of the new tri-grams, it is determined if a next bi-gram exists, step $36_2$. If a next bi-gram exists, step $36_1$ is repeated. If a next bi-gram does not exist, the process moves to step 38, which will be explained further below. As can be appreciated, the creation of new bi-grams and tri-grams is all that the tri-gram model speech recognition engine is capable of as generating disfluency models using the existing tri-grams necessarily results in a synthetic quadra-gram sequence of four (4) words, which is beyond the capability of the tri-gram engine. If the engine was capable of (X)-gram sequences of words, the disfluency generation would be relative to the corpus of (X−1)-gram sequence of words.

The new tri-grams are assigned a probability of occurrence, step $36_3$. Assuming the disfluency is random, and equally probably anywhere in speech, the probability of $P(DA_{1-n}B_{1-m})$ equals the probability of $P(A_{1-n}B_{1-m})$, which essentially trains the speech recognition system to ignore the leading disfluency. The probability of $P(A_{1-n}DB_{1-m})$ equals the probability of $P(A_{1-n}B_{1-m})$, which essentially trains the speech recognition system to ignore the intermediate disfluency. Thus, the audio of "on the" is treated the same as "er on the" and "on er the" in the example of the bi-gram "on the". Finally, the probability of a trailing disfluency is the probability of the disfluency as set previously at step $34_2$. A trailing disfluency would be the audio of "on the er" using the above example. Thus, the probability of $A_{1-n}B_{1-m}D$ is the same as the probability of D. Thus, $P(A_{1-n}B_{1-m}D)$ equals P(D), which is 1% in this particular exemplary embodiment.

As can be appreciated, the clean language model is modified by the new bi-grams and new tri-grams to form the modified language model, step 38. Thus, the speech recognition system 100 would use the modified language model to convert the word sequences into text output 112 that simply ignores the disfluency for all intents and purposes.

Of course, if there are V words in a given language, there are $V^2$ potential bi-grams and $V^3$ potential tri-grams. Typically, however, a corpus of material will have many less bi-grams and tri-grams than possible. Thus, for example, the corpus used to generate the language model may not specifically have a tri-gram of ABC although the corpus in fact has at least individual occurrences A, B, and C uni-grams. The probability of the tri-gram ABC may still be generated, however. The calculation of the probability of the tri-gram ABC occurring, despite not being an entry in the language model, is generally accomplished by "backing off" to lower order n-grams, in the case of ABC, we use the probability of BC multiplied by a back off weight. As explained above, the back off weight may be calculated a number of different ways. One exemplary method that is satisfactory involves determining the probability of the tri-gram ABC as $P(ABC)=B_{AB}*P(BC)$. $B_{AB}$ is generically known as the back off weight and its value is usually recorded along with the bigram AB in the language model. The probability of ABC, which is P(ABC), is based on the probability of BC, which is P(BC) and the back off weight is the proportional likelihood that C can follow the bi-gram AB. In any event, the calculation of the back off weights is generally known in the art and will not be further explained herein. With the addition of the new bi-grams and the new tri-grams to the modified language model, the process calculates new back off weights, as required, consistent with the model already established to generate the back off weights of the clean language model, step 37.

As can now be appreciated, the modified language model contains many more n-grams (new or synthetic bi and tri grams) than the clean language model. The increase in the number of n-grams increases the memory footprint contained in the language model memory 108, which may impact the speed at which the speech recognition engine 100 can recognize the audio data stream 108. Thus, optionally, certain n-grams contained in the modified language model may be removed or pruned, step 40. Essentially, as the corpus used to develop the language model does not have all possible combinations of words (hence the need for the back off weights), it suffices to have a language model that is "good enough" rather than "perfect". The notion of "good enough", is driven by the end-user's perception: Is the error rate in the transcription acceptable? The typical language model has numerous esoteric entries that occur infrequently in typical speech. Thus, the rarest (or, at least, rarer) entries in the language model can be removed, which reduces the size of the memory footprint, without impacting its perceived accuracy—although absolute accuracy may be somewhat reduced. If the eliminated n-grams should occur in practice, their probabilities can be estimated using back off weights and lower-order n-grams similar to current methodologies for n-grams that did not occur in the original corpus of material in the first place. Thus, one exemplary approach to reducing the size of the modified language model is to set probability thresholds for each set of n-grams (i.e., uni-grams, bi-grams, etc.) and eliminate the n-grams which fall beneath the threshold. Note that the elimination of a given n-gram will also eliminate the (n+1)-grams which contain that n-gram.

One exemplary method for reducing the n-grams may be termed an empirical approach. The term empirical should not be construed as limiting. The empirical approach specifies the desired size of the pruned, modified language model, i.e. that it should be X % of the original or no larger than a predetermined size, whatever that size. The system uses this information either to eliminate the rarest (100-X) % uni-grams, bi-grams, etc., or, alternatively, eliminate the bottom (100-X) % tri-grams (assuming the language model stops at tri-grams), because the number of tri-grams is much bigger than the number of uni- and bi-grams.

Another exemplary method for reducing the n-grams may be termed a purist approach. The term purist should not be construed as limiting. The purist approach determines a threshold by a process which optimizes the "perplexity" of the language model subject to the constraint on its total size. The algorithms for performing this optimization are well known in speech recognition. Perplexity is a measure of how well a language model fits a collection of transcripts, and can be thought of as the "average probability" of a tri-gram in a set of transcripts (assuming the language model stops at tri-grams) as scored by the language model; the average used is the geometric rather than arithmetic mean. The higher the average probability, the better the fit and the better the recognition accuracy.

The result of the optional pruning step results in a pruned, modified language model, step 42. The pruned, modified language model is loaded to the language model memory 108 for use by the speech recognition engine 100.

The pruned, modified language model is a derivation of the original, clean language model that accommodates the occurrence of filled pauses and repetitions and fits within the optional size constraint. If a modified language model is not generated, the pruning technique could be used on the clean language model to develop a pruned, clean language model. The modified language model may not be pruned, as described above, if the modified language model is (1) less than the size constraints imposed or (2) there are no size constraints. When the model is deployed and used by a recognition engine, the raw transcriptions will now include the chosen textual representation of disfluencies.

The chosen textual representations of the disfluencies may, in fact, include the disfluencies, which may be interesting for research purposes to see where disfluencies occur for a given speaker, but more typically, the textual representations of the n-grams with disfluencies will disregard or ignore the disfluency and produce the n-gram without the disfluency. Accordingly, the modified language model (or the pruned, modified language model) is paired with a means of processing the raw transcript in a way that removes the disfluencies and repairs white space, capitalization, punctuation and sentences as appropriate. The process of converting the raw transcribed text into a final human-readable form is known as "inverse text normalization" which is a well-known concept in speech recognition. In one exemplary embodiment, the speech recognition engine 100 uses a set of regular expressions, to spot the occurrences of disfluencies in the raw transcript, remove them, and repair word spacing and word capitalization.

As explained above, the modified language model assumes the same frequency of a disfluency occurring after any given word. In other words, the probability of a disfluency occurring is uniform. However, it may be possible to predict the occurrence of a disfluency after any particular word. The above process essentially creates synthetic n-grams to include the disfluency token when the occurrence of the disfluency is unknown and assigned a random occurrence. In the event the occurrence of the disfluency is known or predictable, the probability of the synthetic n-grams with the disfluency can be modified to the known or predictable outcome. In other words, the assigning of probabilities associated with steps $35_3$ and $36_3$ could assign predetermined probabilities such that the probability of the n-gram ABD is different than the probability of the n-gram XYD, where D represents the disfluency token. As explained previously, speech recognition engines generally function satisfactorily if the n-grams with the disfluency token are assigned the same probabilities.

Figure 3:
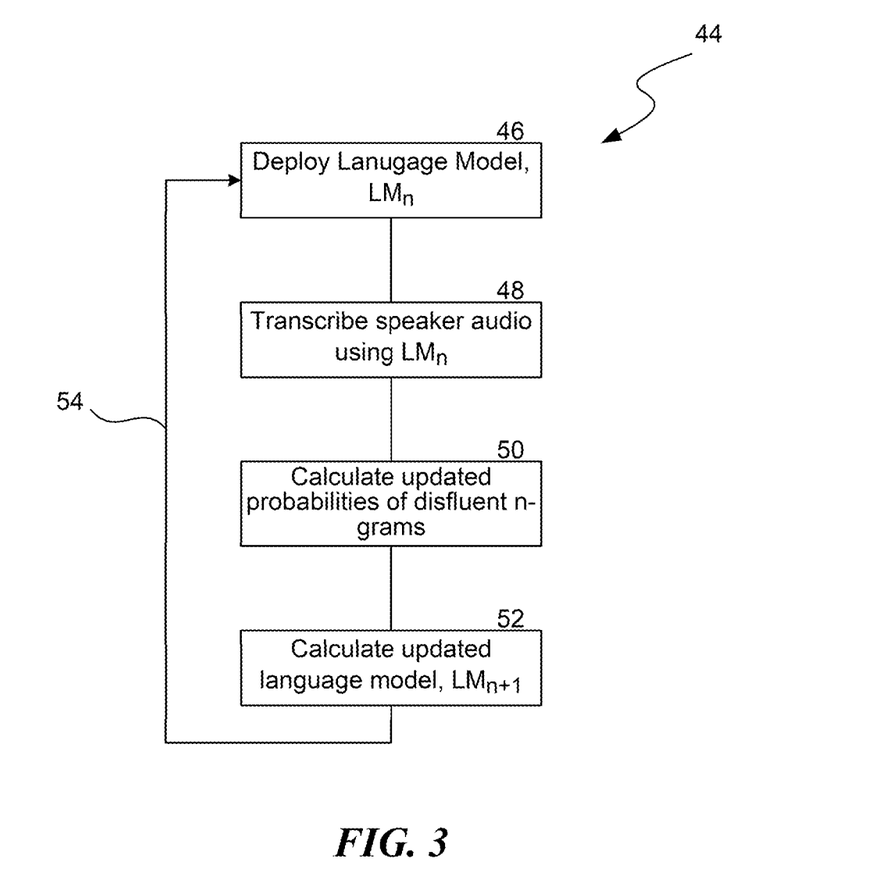
FIG. 3 is a flow chart illustrative of a methodology of updating the model consistent with the technology of the present application.

It is possible to create a modified language model with different probabilities of the synthetic n-grams, which will be identified as a synthetic language model (to distinguish it as a subset of modified language models). When the probability of a disfluency is known, the synthetic language model may be updated based on newly obtained information such as the audio data stream 108. Alternatively, and over time, the modified language model, where the probability of a disfluency is originally unknown and is set as equally possible after any word, also may be changed using the methodology represented by flowchart 44, shown in FIG. 3. The process begins with the deployed language model, step 46 (which may be the synthetic language model, with known starting probabilities, or the modified language model, with unknown or preset starting probabilities). The audio data stream 108 is received and processed by acoustic engine 102 using the acoustic model memory 104 and the language model memory 108 to produce output 116, step 48. The disfluencies are identified by the speech recognition engine 100 (as a match for an n-gram with the disfluency token). The probability of the n-grams with the disfluency token is recalculated based on the additional information, step 50. The process next updates the language model with the new probabilities, step 52, and replaces the deployed language model with the updated language model, step 54, which is represented by the feedback arrow. This may either revise the synthetic language model or make the modified language model a synthetic language model. For example, if the n-gram ABD was repeated 16 times but the n-gram ACD was used only once in the audio data stream input 110, that information could be used to adjust the probabilities of n-gram ABD and ACD based on the new, albeit limited, information.

Figure 4:
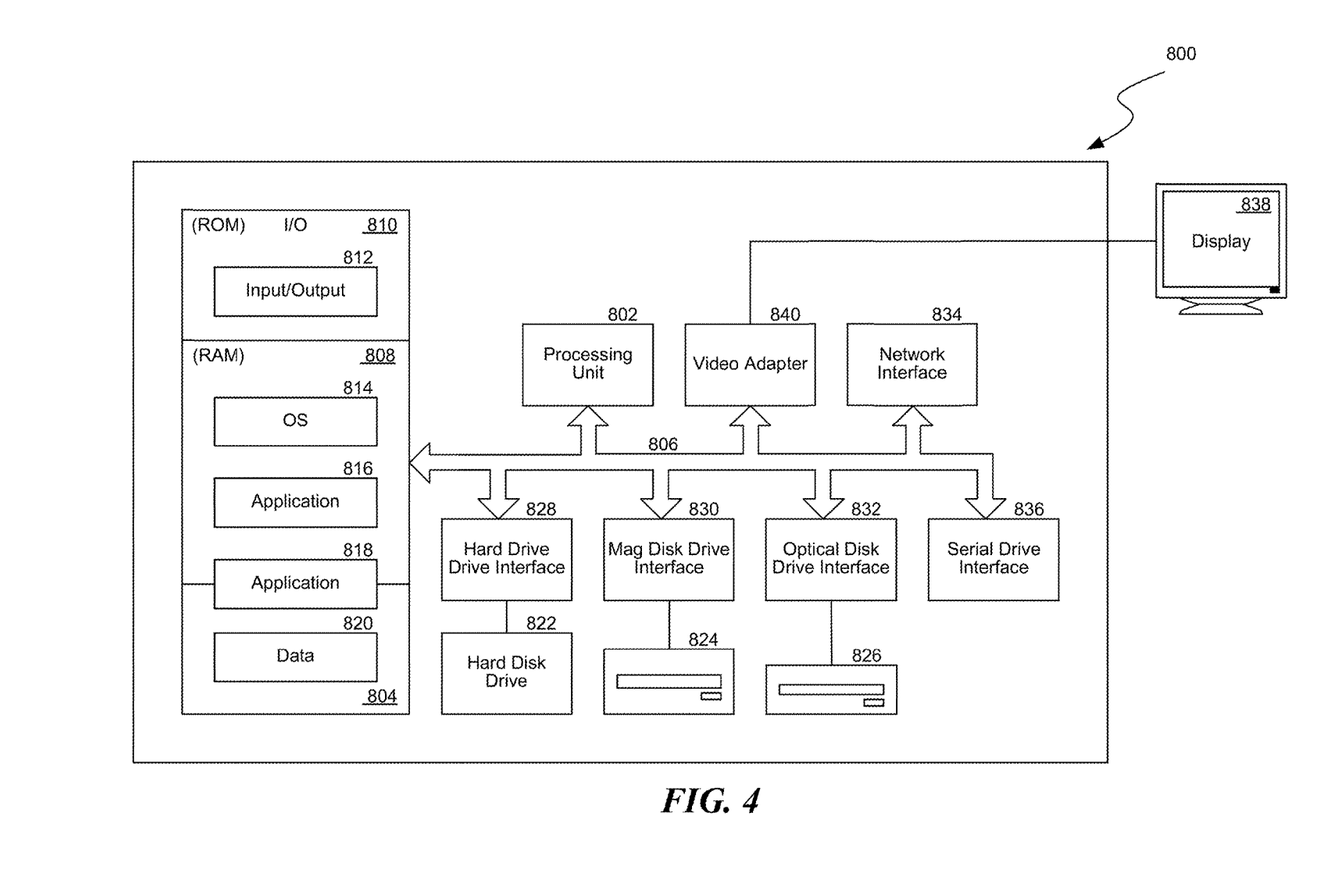
FIG. 4 is a functional block diagram of a device on which the technology of the present application may be implemented.

Referring now to FIG. 4, a functional block diagram of a typical client device 800 for the technology of the present application is provided. Client device 800 is shown as a single, contained unit, such as, for example, a desktop, laptop, handheld, or mobile processor, but client device 800 may comprise portions that are remote and connectable via network connection such as via a LAN, a WAN, a WLAN, a WiFi Network, Internet, or the like. Generally, client device 800 includes a processor 802, a system memory 804, and a system bus 806. System bus 806 couples the various system components and allows data and control signals to be exchanged between the components. System bus 806 could operate on any number of conventional bus protocols. System memory 804 generally comprises both a random access memory (RAM) 808 and a read only memory (ROM) 810. ROM 810 generally stores a basic operating information system such as a basic input/output system (BIOS) 812. RAM 808 often contains the basic operating system (OS) 814, application software 816 and 818, and data 820. System memory 804 contains the code for executing the functions and processing the data as described herein to allow the present technology of the present application to function as described. Client device 800 generally includes one or more of a hard disk drive 822 (which also includes flash drives, solid state drives, etc. as well as other volatile and non-volatile memory configurations), a magnetic disk drive 824, or an optical disk drive 826. The drives also may include zip drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown). Client device 800 has network connection 834 to connect to a local area network (LAN), a wireless network, an Ethernet, the Internet, or the like, as well as one or more serial port interfaces 836 to connect to peripherals, such as a mouse, keyboard, modem, or printer. Client device 800 also may have USB ports or wireless components, not shown. Client device 800 typically has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology. The speech recognition engines may have similar constructions.

Those of skill would further appreciate that the various illustrative logical blocks, modules, circuits, and algorithm steps described in connection with the embodiments disclosed herein may be implemented as electronic hardware, computer software, or combinations of both. The present technology comprises non-transient medium and does not include carrier wave signals. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method of modifying a clean language model to account for at least one type of disfluency by a speech recognition engine, the method comprising:
    providing, by at least one processor, a clean language model, wherein the clean language model comprises a plurality of n-grams generated from a corpus of written material, and wherein the plurality of n-grams include a plurality of uni-grams and at least one bi-gram;

creating, by the at least one processor, at least a first disfluency token, wherein the first disfluency token represents a disfluency of a first type, and wherein the first disfluency token is associated with at least one pronunciation of the disfluency of the first type;

generating, by the at least one processor, at least a first plurality of synthetic n-grams from the plurality of uni-grams and the first disfluency token, wherein generating the plurality of synthetic n-grams includes generating, for each given uni-gram of the plurality of uni-grams, (1) a corresponding first synthetic bi-gram comprising the given uni-gram preceded by the disfluency represented by the first disfluency token and (2) a corresponding second synthetic bi-gram comprising the given uni-gram followed by the disfluency represented by the first disfluency token;

assigning, by the at least one processor, probabilities of occurrence associated with each first synthetic bi-gram and each second synthetic bi-gram, wherein (1) the first synthetic bi-gram is assigned a first probability that is equal to a probability of occurrence of the given uni-gram, and (2) the second synthetic bi-gram is assigned a second probability that is equal to a probability of occurrence of the disfluency represented by the first disfluency token;

adding, by the at least one processor, the generated plurality of synthetic n-grams to the clean language model to form a modified language model;

loading, by the at least one processor, the modified language model into a memory for use by a speech recognition engine such that audio that includes at least one disfluency of the first type is processed by the speech recognition engine for conversion into text using the modified language model; and using the modified language model to convert audio containing at least one disfluency to text.

2. The method of claim 1 wherein the at least one bi-gram is a plurality of bi-grams, and wherein the clean language model further includes at least one first tri-gram.

3. The method claim 2 further comprising generating, by the at least one processor, a plurality of synthetic tri-grams from the plurality of bi-grams and the disfluency token.

4. The method of claim 3 wherein generating the plurality of synthetic tri-grams comprises generating at least three synthetic tri-grams for each given bi-gram of the plurality of bi-grams.

5. The method of claim 3, further comprising assigning, by the at least one processor, probabilities of occurrence to each of the plurality of synthetic tri-grams.

6. The method of claim 5, further comprising:
receiving, by the at least one processor, an audio data stream;
identifying, by the at least one processor, one of the plurality of synthetic tri-grams from the audio stream in which the disfluency of the first type occurs; and
adjusting, by the at least one processor, a probability of occurrence of the identified synthetic tri-gram in response to the identification of the synthetic tri-gram.

7. The method of claim 1, further comprising:
creating a second disfluency token, wherein second disfluency token represents a disfluency of a second type different from the first type, and wherein the second disfluency token is associated with at least one pronunciation of the disfluency of the second type; and generating, by the at least one processor, a second plurality of synthetic n-grams from the plurality of uni-grams and the second disfluency token.

8. The method of claim 1 wherein the disfluency of the first type is a filled pause disfluency.

9. The method of claim 1 wherein the disfluency of the first type is a repetition disfluency.

10. The method of claim 1 further comprising pruning, by the at least one processor, the modified language model to reduce a memory footprint.

11. The method of claim 10 wherein pruning includes removing at least one synthetic n-gram from the modified language model.

12. The method of claim 1, wherein the clean language model comprises back off weights associated with the plurality of n-grams, and wherein the method further comprises calculating, by the at least one processor, new back off weights for the modified language model based at least in part on the probabilities of occurrence of each of the generated plurality of synthetic n-grams.

13. The method of claim 1, wherein the probabilities of occurrence are predetermined probabilities.

14. The method of claim 13, wherein the predetermined probabilities are the same for different synthetic n-grams of the plurality of synthetic n-grams.

15. The method of claim 1, wherein the probabilities of occurrence are different based on known occurrence levels of particular synthetic n-grams of the plurality of synthetic n-grams.

16. The method of claim 1, wherein the corpus of written material does not include disfluencies of any type including any of repairs, repetitions, and filled pauses.

17. An apparatus for speech recognition comprising:
at least one processor;
at least one memory operatively coupled to the at least one processor; and
code stored in the memory and executable by the at least one processor to cause the at least one processor to perform a method of:
providing a clean language model, wherein the clean language model comprises a plurality of n-grams generated from a corpus of written material, and wherein the plurality of n-grams include a plurality of uni-grams and at least one bi-gram;
creating at least a first disfluency token, wherein the first disfluency token represents a disfluency of a first type, and wherein the first disfluency token is associated with at least one pronunciation of the disfluency of the first type;
generating at least a first plurality of synthetic n-grams from the plurality of uni-grams and the first disfluency token, wherein generating the plurality of synthetic n-grams includes generating, for each given uni-gram of the plurality of uni-grams, (1) a corresponding first synthetic bi-gram comprising the given uni-gram preceded by the disfluency represented by the first disfluency token and (2) a corresponding second synthetic bi-gram comprising the given uni-gram followed by the disfluency represented by the first disfluency token;
assigning probabilities of occurrence associated with each first synthetic bi-gram and each second synthetic bi-gram, wherein (1) the first synthetic bi-gram is assigned a first probability that is equal to a probability of occurrence of the given uni-gram, and (2) the second synthetic bi-gram is assigned a second probability that is equal to a probability of occurrence of the disfluency represented by the first disfluency token;

adding the generated plurality of synthetic n-grams to the clean language model to form a modified language model;

loading the modified language model into a memory for use by a speech recognition engine such that audio that includes at least one disfluency of the first type is processed by the speech recognition engine for conversion into text using the modified language model; and using the modified language model to convert audio having the at least one disfluency to text.

* * * * *